United States Patent [19]

Nordgren et al.

[11] 4,367,021

[45] Jan. 4, 1983

[54] METHOD AND APPARATUS IN TUNNELING

[76] Inventors: Bo G. Nordgren, Vikingavagen 57, Box 6020, S-183 06 Täby; Bo Åkerlind, Ludgovägen 8, S-125 40 UM/ A/ lvsjö; Klaus Biedermann, Föreningsvagen 4, S-182 74 Stocksund, all of Sweden

[21] Appl. No.: 201,485

[22] PCT Filed: Nov. 1, 1979

[86] PCT No.: PCT/SE79/00223

§ 371 Date: Jul. 3, 1980

§ 102(e) Date: Jun. 23, 1980

[87] PCT Pub. No.: WO80/01003

PCT Pub. Date: May 15, 1980

[30] Foreign Application Priority Data

Nov. 3, 1978 [SE] Sweden .................... 7811422

[51] Int. Cl.³ .............. G01C 7/06; E21D 9/14; F42D 3/04
[52] U.S. Cl. ..................... 353/121; 33/1 H; 33/DIG. 21; 173/2; 299/1; 353/122
[58] Field of Search .......... 33/1 H, 1 D; 353/121, 353/122; 173/2; 299/1

[56] References Cited

U.S. PATENT DOCUMENTS

| | | | |
|---|---|---|---|
| 3,431,049 | 3/1969 | Nordgren | 353/11 |
| 3,896,885 | 7/1975 | Dahlstrom et al. | 173/2 |
| 4,023,861 | 5/1977 | Schnell | 299/1 |
| 4,267,892 | 5/1981 | Mayer | 173/2 |

FOREIGN PATENT DOCUMENTS 989814  5/1976  Canada ........................... 173/2
1548389  8/1969  Fed. Rep. of Germany .

Primary Examiner—Steven L. Stephan
Attorney, Agent, or Firm—McAulay, Fields, Fisher, Goldstein & Nissen

[57] ABSTRACT

Disclosed is a method for marking out drill holes in accordance with a predetermined drill hole pattern. A direction reference beam (c) is projected in a direction defining the direction of the tunnel and part of a beam (e) is deflected from the reference beam, the part of the beam is passed to a beam derivating means ($d_2$) by means of which the part beam is directed in accordance with a predetermined drill hole pattern onto the rock surface (4) to present thereon images of the part beam at locations of intended drill holes. Correspondingly, a device for executing said method comprises means ($d_1$) for deflecting at least part of a direction reference light beam (c) to form part of a beam (e), and means ($d_2$) to direct the part of the beam onto locations of drilling holes for explosives in accordacne with a predetermined pattern.

10 Claims, 3 Drawing Figures

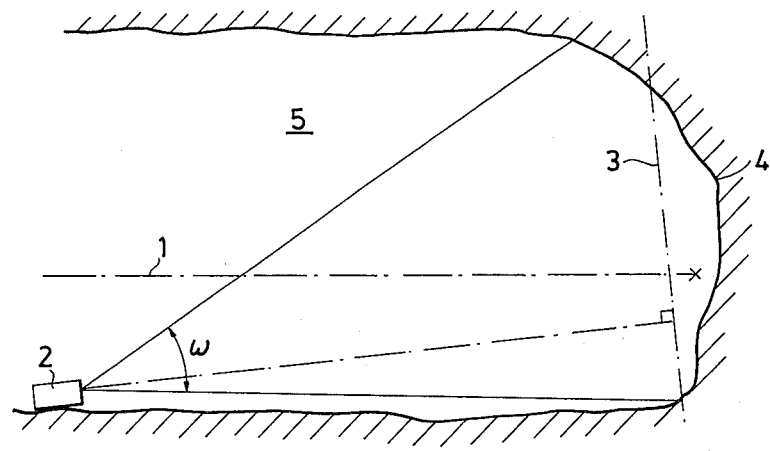
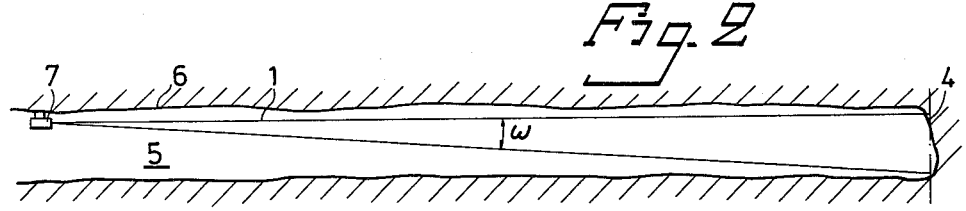
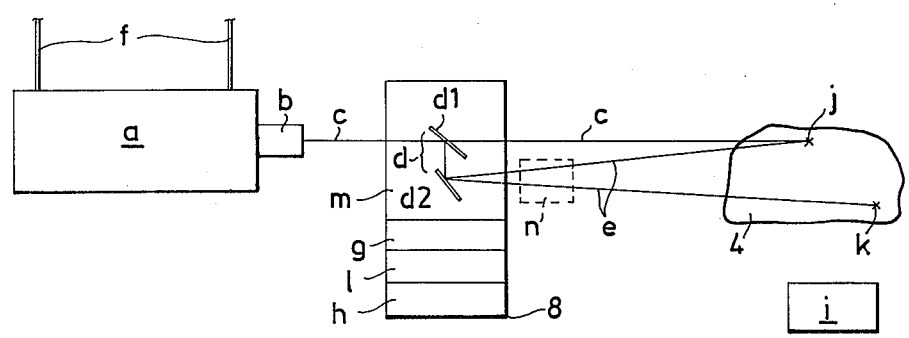

METHOD AND APPARATUS IN TUNNELING

BACKGROUND OF THE INVENTION

A tunneling method for marking out drill hole patterns on the face of the rock by projecting the image of a slide provided with markings representing the positions of holes to be drilled on a reduced scale belongs to prior art is described in U.S. Pat. No. 3,431,049. This known method necessitates a separate direction determining means, a direction laser, for instance, as a reference in respect of the tunnel direction, as well as comparatively complicated measures for correcting the position of pattern points of a slide to correspond to correct positions of drill spots on the rock surface when projecting the slide image onto the rock face. This is due to the fact that the face of the rock, after a blast for instance, has varying shapes, which seldom or never constitute a substantially flat surface extending perpendicularly to the optical axis of the projector which projects the slide onto the rock surface. FIG. 1 of the accompanying drawing shows this.

OBJECT AND SUMMARY OF THE INVENTION

One object of the invention is to avoid the abovementioned drawbacks, in particular the need for correcting the slides used for projecting markings for drill holes with respect to a variable shape of the rock surface.

This object is attained in accordance with the invention by utilizing the fact that a projection of a narrow unidirectional light bunch such as and in particular, a laser based projection, allows for such a range of projection as compared with what could normally be effected by means of a projector in which the representation of a pattern is illuminated in its entirety by means of a condensing lens system, that the light beams representing different locations on the drilling spot pattern on the rock surface run substantially parellel to the direction of the tunnel. As a result no measures are required to compensate for irregularities in the rock surface, onto which the drill hole markings are projected.

In practice, the invention brings about a valuable improvement, in that additional work to adjust the shape of the rock surface after blasting in order to obtain a correct marking of the drill holes will not be necessary, thus allowing the desired drill hole pattern on the slide to be projected without any correction.

In a preferred embodiment of the invention, its device comprises one single light source, generating a beam of substantially parallel light rays, suspended from the roof of the tunnel, to be used during a plurality of markings for subsequent drillings and blastings, for example by means of a "remote control box", which, in case the device is equipped with a data program defining different surface drill spot patterns, obviously may be arranged for selecting a desired program and marking of a selected drill spot of the pattern. An important advantage of using light beams consisting of unidirectional rays, laser beams in particular, when projecting images corresponding to drill locations is the possibility thereby to obtain on the rock wall distinct and easily observable spots under varying ambient light conditions and projection distances. Further, the invention makes it possible to use one single laser source for the vitally important laying-out of tunnel direction as well as for the laying-out of drill spot positions in a manner superior to prior art. A still further advantage is that the device can be used within coal mines, in which conventional light projection of drill hole is not allowed because of safety rules aimed at avoiding explosions.

BRIEF DESCRIPTION OF THE DRAWING

The invention will become more apparent from the following description of a preferred embodiment thereof, illustrating a best mode of the invention, in connection with the accompanying drawing, whereas FIG. 1 illustrates a prior art method for defining a tunnel direction by aid of a reference laser light beam in connection with marking of drill hole positions by means of film slide projection utilizing either a fixed predetermined distance between a lens system projector and the image plane on or adjacent, respectively, the rock surface or a variable focal distance (zoom) for selecting the focal distance to obtain a drill hole pattern of desired dimension in the image plane.

FIG. 2 illustrates the projection of not only the tunnel direction defining beam but the drill hole pattern as well onto the rock wall from such a long distance from the image plane, the rock wall, that unevennesses therein are of very little consequence in the accuracy of the marking out of the holes, and FIG. 3 schematically illustrates a preferred embodiment of a device according to the invention.

In the conventional method illustrated by FIG. 1, a direction defining laser is used for defining the direction of the tunnel to be drifted, and generates a coherent beam 1 in the direction of the tunnel. To mark predetermined locations of drill holes, a projector 2 projects an image of a slide provided with a small scale drill hole pattern within a space angle ω towards an image plane 3, selected with the best possible adaptation to present unevennesses of a rock wall 4, in which holes are to be drilled for further blasting of rock in the tunnel 5. To obtain hole marking images at correct locations of the rock wall 4 when projecting the film slide onto the wall it is necessary to correct the markings of the slide, in relation to an intended drill hole pattern, with respect to the shape of the rock wall 4. This measure implies not only a time consuming choice of slide pattern amongst a plurality of slides having pattern images approximately adapted to a corresponding number of different shapes of walls, but as well as time consuming calculations for correcting, on the rock wall, the position of holes to be drilled relative to corresponding projected hole images.

FIG. 2 illustrates the method according to the invention by utilizing light beams of unidirectional light rays, a laser light beam in particular, for projecting a drill hole pattern image at such large a distance from the rock wall that the light beams for the different holes of the pattern could generally be considered as hitting the wall in a direction parallel to the direction of the tunnel and the light beam 1 defining the tunnel direction.

The device according to the invention, designated by reference character 7, is advantageously mounted close to the tunnel roof 6. So mounted, the device may stay at this location during a plurality of marking and subsequent blasting cycles without being interfered with by intermediate clearing works.

FIG. 3 illustrates a preferred embodiment of a device according to the invention, which comprises a laser beam source a with a collimator b generating a laser beam c having a direction defining the extension of the tunnel to be drifted. This laser beam then passes a transparent mirror d1, through which part of the beam proceeds in an unchanged direction, constituting a direction reference beam c of the device, while part of the laser beam is reflected towards a second mirror d2, which directs this part of the laser beam substantially in the same direction as the reference beam toward the end wall 4 of the tunnel, where the drill holes are to be marked according to pattern. The pair of mirrors d, consisting of the mirrors d1 and d2, are adjustable relative to each other to project a light beam e in a direction depending on the mutual position of the mirrors d1 and d2. In the embodiment shown the mirrors d1 and d2 are each connected to positioning means for positioning the mirrors mutually in such a manner that the wall surface 4 may be scanned by beam e which by controlling the positioning of the mirrors, may be directed towards any selected point within a space angle, the maximal size of which is selected with respect to the smallest desired distance and the largest desired wall surface.

The device comprises attachment and position adjusting means f so as to be steadily mounted at a selected location and adjusted to present a desired direction of the tunnel direction reference beam c. A control means 8 for controlling the positioning of the pair of mirrors d1 and d2 for directing the beam e in a selected direction for presenting a light spot representing the position of a hole to be drilled comprises, as illustrated, a RAM-memory g having a capacity for a large number of drill hole patterns. Further, the control means 8 comprises a micro-computer 1 which is programmed for translating drill hole coordinates present in the memory into a corresponding angle dependent on the distance between the device and the tunnel end wall, that is, a kind of "electrical zoom", and generating a signal controlling the positioning of the mirrors. Such positioning is provided for by means of two step motors, represented by block m, one for each mirror, receiving a corresponding control signal generated by a scan signal generator h.

When preparing the marking of drill hole positions according to a programmed pattern, the beam e is being directed, by actuating the scan signal generator h remotely from a control box i, for instance, first to the image j of the reference beam c, then to a selected orientation point k at a predetermined distance from point j, whereby an information adequate for determining the present distance from the laser projector device to the rock surface has been fed into the micro-processor 1 of the control means 8. Then, the marking of the drill spots may proceed by actuating the micro-processor 1 to translate the drill hole coordinates of a selected drill spot pattern present in the memory g into angle valid for the stated distance, thus deviating the beam e to a direction of the location of drill holes in wall 4.

By aid of the control box i the operator selects a desired hole pattern in the memory g and a forward stepping of points in the pattern, while marking the hole locations by painting or adjusting drilling tools correspondingly.

It is obvious to those skilled in the art, that the control of the beam e for light spot marking of drill positions in accordance with a selected pattern may be provided for in a number of other ways, for instance by letting the micro-processor control a continuous scanning of the pattern, for instance so as to simultaneously present images of all drill spots of a pattern.

In another embodiment according to the invention and as an alternative to drill hole patterns programmed in a memory of a micro-processor, drill hole patterns in form of slides or perforated plates having apertures corresponding to positions of drill holes on a selected scale, are projected however, without using an optical lens system for generating a large scale image of a small scale slide. In this embodiment the beam e is deviated, by means of a pair of mirrors or other device for directing a light beam into different directions in accordance with a predetermined pattern to scan the slide or hole plate, represented by block n in FIG. 3, light points corresponding to the drill spot pattern being projected onto the rock wall through transparent portions of the slide or holes of the plate, the position of which relative to the exit point of the ray from the scanning means, is being adjusted with respect to the distance to the rock wall.

We claim:

1. A method for marking out drill hole patterns on the surface of a rock in accordance with a predetermined pattern by projecting spots of drilling hole positions onto the rock face within the cross-section of a tunnel, comprising:
    projecting from a light source a substantially unidirectional light beam constituting a fixed reference beam representative of the tunnel direction;
    deflecting a part of said beam;
    directing said part of said beam through beam deviation means toward the face of the tunnel within an angle at least corresponding to a space angle within which the cross-section of said tunnel appears from said light source;
    causing said part of said beam to pass towards the surface of said cross-section of said tunnel solely within portions of the space angle scanned by said beam deviation means corresponding to coordinates of drill spots on said surface in accordance with said predetermined pattern.

2. The method of claim 1, wherein said deflected part of said beam is directed sequentially toward the surface of the rock cross section in directions determined by drill hole coordinates of patterns programmed into a data processor having a memory containing said coordinates in a plurality of drill spot patterns and means for transforming said coordinates into control signals for said beam deviation means representing deviation angles for presenting a pattern of drill spots on said surface in a scale dependent upon information about the distance between said surface and said beam deflecting means introduced into said processor.

3. The method of claim 1 or 2, further including the steps of:
    measuring a distance of a predetermined length on said rock surface;
    directing said part of said beam sequentially toward the end points of said distance for determining in said data processor a reference datum representative of the distance between said surface and said beam deviation means dependent upon said distance to project a selected drill spot onto the rock's cross sectional surface on a predetermined scale.

4. The method of claim 1, wherein said part of said beam scans an image of the pattern of drill spots.

5. A device for marking out drill spots in accordance with predetermined hole patterns by projecting a pattern of drill spots onto the face of a rock to be blasted, comprising a light source for generating a reference light beam defining the direction of tunneling;
    means for deflecting a part of said beam;

beam deviating means for directing said part of said beam substantially parallel with said reference light beam towards said face of said rock, while deviating said part of said beam, continuously or stepwise, for projecting a pattern of drill hole spots onto said face.

6. The device of claim 5, further comprising:
means for directing said part of said beam sequentially towards points on said face located at a predetermined distance from each other;
angle measuring means for determining the angles between such directions of said part of said beam;
means for determining on the basis of said angles a scale for controlling said beam deviation means for directing said beam onto said face to present a spot having a selected size independent of the distance between said device and said face of said rock.

7. The device of claim 6, further including:
a processor having a memory containing data representing coordinates of drill spots of a number of individually selectable drill spot patterns, and
means for generating control signals for sequentially setting said beam deviation beams to direct said part of said beam in accordance with a selected pattern of drill spots on a scale determined by the angle measured by said angle measuring means.

8. The device of claim 5 wherein said beam deviating means comprises a pair of mirrors.

9. The device of claim 8, wherein each mirror has a motor for positioning same according to control signals generated by a scan signal generator.

10. The device of claim 5, wherein said light source is a laser.

* * * * *